United States Patent [19]
Pichler

[11] Patent Number: 5,363,744
[45] Date of Patent: Nov. 15, 1994

[54] ACCUMULATOR PISTON HAVING MULTIPLE ELASTOMERIC SEALS

[75] Inventor: Gerald P. Pichler, Dearborn, Mich.

[73] Assignee: Federal-Mogul Corporation, Southfield, Mich.

[21] Appl. No.: 163,317

[22] Filed: Dec. 7, 1993

[51] Int. Cl.$^5$ .......................... F16J 7/00; F16L 55/04
[52] U.S. Cl. .......................... 92/242; 92/243; 92/248; 92/249; 92/261; 277/212 F; 277/178; 138/31
[58] Field of Search .................. 92/175, 240, 241, 242, 92/243, 244, 245, 248, 249, 250; 277/212 F, 178; 138/31

[56] References Cited

U.S. PATENT DOCUMENTS

| | | | |
|---|---|---|---|
| 1,797,781 | 3/1931 | McCaughey | 92/254 |
| 2,764,998 | 10/1956 | McCuistion | 138/31 |
| 2,808,302 | 10/1957 | Bowerman | 92/254 |
| 4,214,507 | 7/1980 | Hock et al. | 92/254 |
| 4,515,378 | 5/1985 | Marshall . | |
| 4,521,027 | 6/1985 | Marshall . | |
| 4,796,895 | 1/1989 | Perkins . | |
| 4,892,427 | 1/1990 | Ford | 92/245 |
| 5,022,312 | 6/1991 | Rozek et al. . | |

FOREIGN PATENT DOCUMENTS

| | | | |
|---|---|---|---|
| 3244866 | 10/1991 | Japan | 138/31 |
| 2033537 | 5/1980 | United Kingdom | 92/248 |

*Primary Examiner*—Thomas E. Denion
*Attorney, Agent, or Firm*—Lawrence J. Shurupoff

[57] ABSTRACT

An accumulator piston is formed as a two-piece plastic molding for simplifying its construction and for cost reduction and weight reduction purposes. The piston has a radially stepped construction in which each step includes a radial flange carrying an annular elastomeric sealing element. The sealing elements have deformable, resilient lips which slidably engage the side surfaces of a stepped cylinder in which the piston reciprocates. One of the elastomeric sealing elements is molded to an annular insert member that is seated in an annular recess formed in one end of the main piston body. The two-piece piston construction facilitates installation and removal of mold cavity members relative to the respective elastomeric sealing elements such that the mold cavity members can be of simplified economical construction.

9 Claims, 1 Drawing Sheet

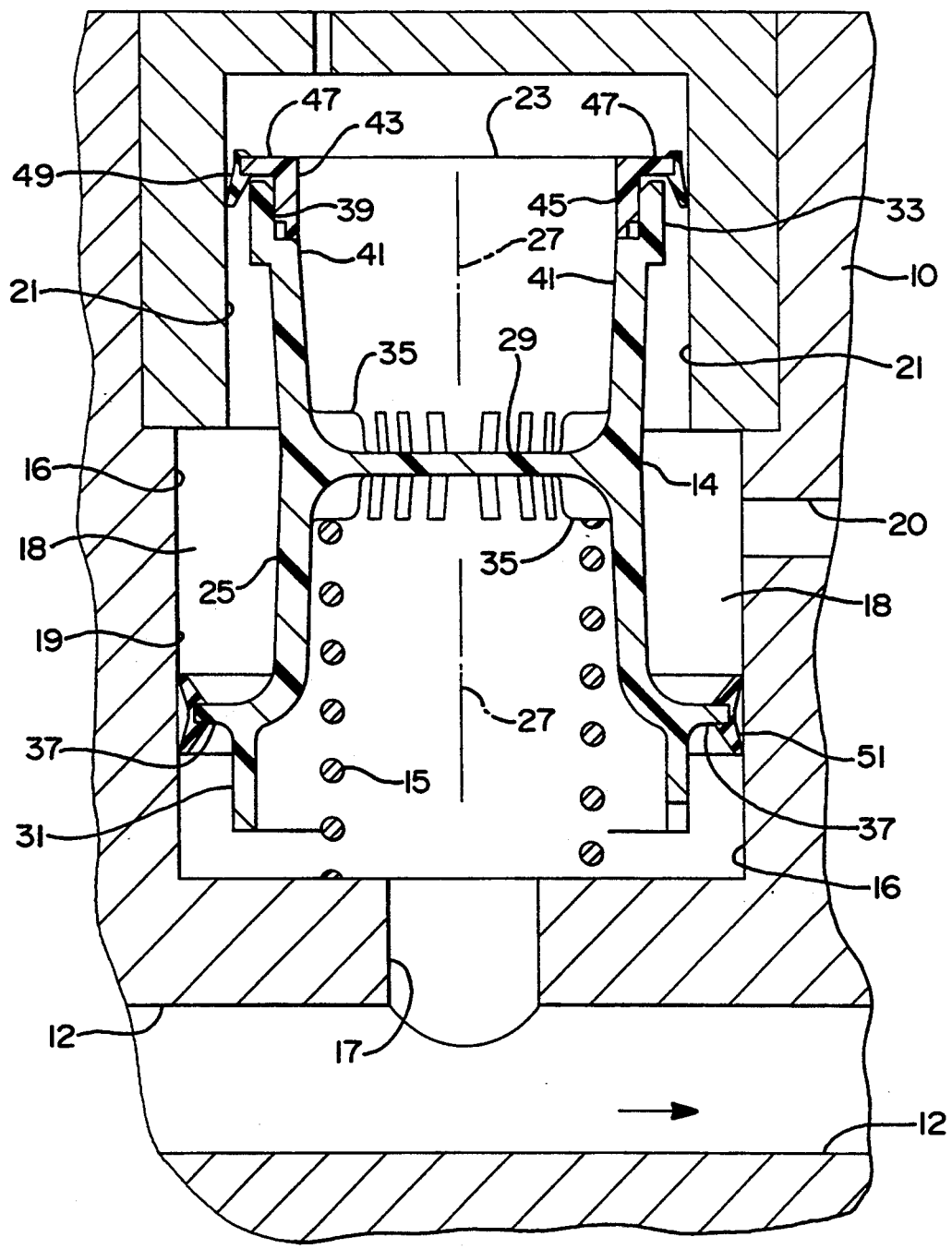

ACCUMULATOR PISTON HAVING MULTIPLE ELASTOMERIC SEALS

BACKGROUND OF THE INVENTION

1. Field of the Invention

The present invention relates generally to pistons, and particularly relates to a plastic accumulator piston constructed from separate components so as to facilitate its manufacture.

2. Description of Prior Developments

An automotive transmission often includes one or more pumps for supplying pressurized hydraulic liquid to clutch actuators located within the transmission. Such transmission actuators perform somewhat better if the pressurized liquid is free from pressure spikes or surges. In order to remove such pressure spikes from the pressurized liquid, the principal liquid passage containing the pressurized liquid is often connected to an accumulator.

The accumulator can include a cylinder containing a floating piston, and some means to bias the piston in a direction opposing the pressure surge. Each pressure spike deflects the piston so as to slightly increase the cylinder volume in communication with the flow passage. The increased cylinder volume dissipates the pressure surge, whereby the liquid is relatively free from pressure pulses or spikes after its passage beyond the accumulator.

In one particular known accumulator construction, the accumulator piston and associated cylinder are of a radially stepped design such that the piston has a first annular sealing element sliding on the cylindrical surface of a larger diameter chamber and a second sealing element sliding on the cylindrical surface of a smaller diameter chamber. A pressurized control liquid is supplied to an annular space surrounding the piston between the two sealing elements.

Due to the area differences between the two chambers, the pressurized control liquid exerts an axial biasing force on the piston, whereby the piston acts as a movable, resilient absorption device for pressure surges in the associated flow passage.

In the described accumulator design, the piston is of cast aluminum construction and each sealing element is an O-ring. It has been found that the O-ring sealing elements tend to fail after a relatively short period of use. Seal failure may be due to the fact that the piston is subject to cyclical motion back and forth in the stepped cylinder.

Turning and flexing of the seal element materials around the cylinder contact points tend to product fatigue failure of the seal element materials.

SUMMARY OF THE INVENTION

The present invention is directed to a radially stepped accumulator piston having a reduced manufacturing cost and an improved service life when compared with the above-described accumulator piston. The improved piston construction is formed out of a rigid plastic or polymer material for cost reduction and weight reduction purposes. The reduced weight somewhat reduces inertia forces, and thus tends to improve the piston response to pressure surges. In the improved accumulator piston, the sealing elements are elastomeric sealing rings molded and bonded to flanges formed on the piston. Each sealing ring has a resilient, deformable annular flap or sealing lip designed to slide on the associated cylinder surface while maintaining the desired fluid seal. These deformable seal lips undergo relatively slight flexure or twist during reciprocation of the piston, so that the seal life is improved over that of conventional O-rings.

The invention includes a two-piece piston construction, wherein each sealing element is molded and bonded to a separately formed, flanged piston component. After the respective sealing elements have been formed and bonded to the respective piston components, the components are assembled together to form the final piston construction.

The purpose for molding the elastomeric seal elements onto separate piston components is to facilitate separation of the seal mold cavity members after completion of the seal molding operations. Such separation of the mold cavity members would be difficult or impossible with one-piece piston construction.

The invention teaches a stepped piston construction having a relatively low manufacturing cost and a reasonably extended seal service life.

BRIEF DESCRIPTION OF THE DRAWINGS

In The Drawings:

The singular FIGURE is a sectional view taken through a piston construction embodying the invention. The piston is shown in association with a piston housing.

DETAILED DESCRIPTION OF THE PREFERRED EMBODIMENTS

The drawing fragmentarily shows a fluid housing 10 having a liquid passage 12 formed therein. Pressurized liquid flows through or along the passage in a left-to-right direction. The flowing liquid can have a surging or pulsing character due, at least partly, to the pump that produces the flow and the devices that receive the flow.

In order to minimize pressure spikes or surges in the flowing liquid, there is provided an accumulator piston 14 arranged in a cylindrical chamber 16 so as to move up and down in response to pressure conditions generated in passage 12. Piston motion is controlled by a control liquid in annular space 18 surrounding the piston. Space 18 is supplied with a relatively stable pressurized liquid via a control passage 20. Passage 20 communicates with a stable liquid pressure source so that the pressure in annular space 18 provides a control force on the piston.

Chamber 16 is a stepped chamber that includes a lower chamber 19 having a relatively large diameter and an upper chamber 21 having a relatively small diameter. The accumulator piston 14 has a similar stepped configuration, whereby an upper elastomeric seal element 49 rides on the cylindrical surface of chamber 21 and a lower elastomeric seal element 51 rides on the cylindrical surface of chamber 19.

Flanges 37 and 47 on the piston have different effective diameters, whereby the pressurized liquid in annular space 18 exerts a relatively low, upward force on flange 47 and a relatively high downward force on flange 37. The net force on the piston due to the pressurized liquid in annular space 18 is in the downward direction, whereby the net liquid force opposes pressure surges in passage 12. The piston communicates with passage 12 via a connector passage 17.

Should the liquid flowing along passage 12 momentarily experience a cyclic pressure surge, the increased pressure pulse will be transmitted to the undersurface of the piston so as to momentarily move the piston upwardly in chamber 16, thereby dissipating the pressure surge with a slight volumetric increase in the space below the piston. As the pressure surge is dissipated, the control force provided by the liquid in annular space 18 returns the piston downwardly to its initial position for response to the next pressure surge in passage 12.

A relatively light coil spring 15 may be provided below the piston to oppose the restorative action of the pressurized liquid in annular space 18. Spring 15 has some benefit in limiting the piston stroke and preventing piston overshoot.

The present invention concerned particularly with the construction of accumulator piston 14. The piston includes a molded, rigid plastic body 23 that includes a tubular body portion 25 centered on a central vertical axis 27. The drawing shows the molded tubular body oriented in a vertical direction. However, it will be appreciated that the tubular body can be oriented in any desired direction depending on the particular application.

An integral partition 29 transversely spans tubular body portion 25 at an intermediate point between the lower end 31 and the upper end 33 of body portion 25. Gussets or ribs 35 may be molded integrally with the plastic body 23 to strengthen partition 29 against flexure. Such flexure is sometimes referred to as oil-canning.

A first radial flange 37 extends outwardly from tubular body portion 25 near its lower end 31. The upper end 33 of tubular body portion 25 is formed with an annular recess 39 in its inner surface 41.

Seated within annular recess 39 is a separate, rigid plastic insert designated generally by numeral 43. As shown in the drawing, insert 43 has an L-shaped cross section including an axial section 45 located within recess 39 and a second flange 47 extending radially outwardly from axial section 45. Insert 39 is a rigid annular ring-like structure having a constant cross section around its circumference. Flange 47 forms a mounting surface for an annular elastomeric seal element 49. The other flange 37 forms a mounting surface for an annular elastomeric seal element 51.

Annular insert 43 may be affixed to tubular body portion 25 by a solvent applied to the mating axial surfaces on recess 39 and axial section 45. The mating axial surfaces will be manufactured to have an interference fit but will be in a softened condition due to the solvent adhesives, such that the annular insert 43 can be moved axially into recess 39 without difficulty.

The solvent adhesive connection provides a reproducible flange 47 position, i.e. the peripheral edge of flange 47 is, in each manufactured piston, the same predetermined distance from the central axis 27 within a relatively small tolerance range. This is advantageous in that the associated seal element 49 is ensured of having a reproducible cross section and a good sliding seal action on the surface of cylindrical chamber 21 with a high degree of predictability or repeatability.

Of course, other methods may be used to secure the insert 43 to the body portion 25. For example, adhesive bonding with glue, ultrasonic welding, vibration welding and spin welding could be used in place of the solvent welding noted above. Pure mechanical connections could also be used such as snap-fit and threaded interconnections. It is also possible to use radio frequency welding and induction welding.

Seal element 49 is molded onto flange 47 prior to installation of plastic insert 43 into annular recess 39. The seal element molding operation involves placement of the formed plastic insert 43 into a mold cavity that has facing sections thereof clamped against the upper and lower surfaces of flange 47. The annular mold cavity has a cross sectional shape for forming the elastomer into a desired shape suitable for outer edge sealing engagement with the cylindrical surface of chamber 21. The elastomer is forced into the annular mold cavity by injection or compression such that the elastomer preferably bonds to both radial faces of flange 47 and the interconnecting peripheral edge of the flange.

Seal element 51 is molded and bonded to flange 37 by the same type of molding process that is used for seal element 49. The two seal elements 49,51 are generally similar, except that seal element 51 has a larger diameter by reason of the flange dimensions. Flanges 37,47 are dimensioned with their peripheral edges spaced different distances from central axis 27, whereby the accumulator piston has a radially stepped configuration suitable for its intended purpose.

A principal feature of the invention is that seal elements 49,51 are molded onto different rigid plastic structures. Thus, seal element 49 is molded to plastic insert 43, whereas seal element 51 is molded to plastic body 23. The seal element molding operations are performed separately, using separate mold cavity assemblies. This is advantageous in that the seal element molding operations can be carried out without interference of one operation by the other operation.

As regards the seal molding operations, if plastic flange 47 were formed integrally with tubular body 23, it would be difficult to assemble all of the seal molding cavity members around the piston in order to perform the seal molding operations. Additionally, it would not likely be possible to separate formed seal element 49.

In particular, the mold cavity element in contact with the lower face of flange 47 would be trapped in the space between the two seal elements 49,51. Removal or initial installation of that mold cavity element could not be readily accomplished, except by splitting the mold cavity member into two semi-circular half sections. However, such an expedient would produce axial mold separation marks on the edge surface of the sealing element. Such separation marks could adversely affect seal performance, i.e. produce leakage of liquid from space 18.

By molding seal elements 49,51 on separate plastic members 43,25, it is possible to carry out each seal molding operation without mutual interference or mold-separation difficulties.

Each sealing element 49,51 has a sealing flap or resilient deformable lip projecting away from the central axis 27. Sealing element 51 has a second deformable lip since it is required to seal in two directions. Installation of the piston into the stepped chamber 16 causes the sealing lips to be deflected radially inwardly, whereby the lips have sliding pressure engagement with the associated chamber surfaces.

Seals of the type shown in the drawing have been found to provide superior seal performance compared to conventional O-ring seals when used in a piston accumulator environment. Cyclic reciprocating motion of the piston through relatively small stroke distances tends to wear out the O-ring seal surfaces. The deformable lip seals shown in the drawing tend to slide and wear better with lesser fatigue failure and longer service life than O-ring seals.

The use of the deformable lip seals 49,51 is facilitated by the fact that sealing element 49 is molded onto an annular insert 43 that is formed separately from the tubular plastic piston body 23.

What is claimed is:

1. An accumulator piston, comprising:
   a molded, rigid plastic body that includes a tubular body portion centered on a central axis, said tubular body portion having first and second ends, a first flange extending radially outwardly from said tubular body portion near said first end, an annular recess formed in said second end, and a partition transversely spanning the tubular body portion at an intermediate point between said first and second ends;
   a molded, rigid, annular plastic insert comprising an axial section seated in said annular recess, and a second flange extending radially outwardly from said axial section;
   a first annular elastomeric seal mounted on said first flange; and
   a second annular elastomeric seal mounted on said second flange.

2. The accumulator piston of claim 1, wherein said first and second elastomeric seals are respectively molded to said first and second flanges.

3. The accumulator piston of claim 1, wherein each flange has two radial faces and an interconnecting peripheral edge; each elastomeric seal being permanently molded to the associated flange so that a continuous ring of elastomeric material is bonded to both radial faces and the interconnecting peripheral edge of the associated flange.

4. The accumulator piston of claim 1, wherein said tubular body portion has an inner side surface and an outer side surface, said annular recess being formed in the inner side surface of said tubular body portion.

5. The accumulator piston of claim 4, wherein said annular insert has an L-shaped cross section, the axial section of the insert constituting one leg of the L-shape, said second flange constituting the other leg of the L-shape.

6. The accumulator piston of claim 5, wherein the axial section of the annular insert and the annular recess have mating axial surfaces permanently interconnected.

7. The accumulator piston of claim 1, wherein said first flange has a first peripheral edge spaced radially outwardly from said central axis, and said second flange has a second peripheral edge spaced radially outwardly from said central axis; the spacing of said first peripheral edge from said central axis being greater than the corresponding spacing of said second peripheral edge from said central axis, whereby the piston has a stepped construction.

8. The accumulator piston of claim 1, wherein each elastomeric seal has a resilient deformable lip slidably engageable with a cylinder surface to provide a movable seal between the piston and said cylinder surface.

9. The accumulator piston of claim 1, wherein said first elastomeric seal has two resilient deformable lips extending in opposite directions for slidable engagement with a cylinder surface to provide a two-direction seal action.

* * * * *